United States Patent [19]

Michimori et al.

[11] Patent Number: 4,950,555
[45] Date of Patent: Aug. 21, 1990

[54] MAGNETIC RECORDING MEDIUM

[75] Inventors: Tooru Michimori; Hideaki Nagasaka, both of Gunma; Toshikazu Nakamura, Tokyo, all of Japan

[73] Assignee: Denki Kagaku Kogyo Kabushiki Kaisha, Tokyo, Japan

[21] Appl. No.: 294,998

[22] Filed: Jan. 9, 1989

Related U.S. Application Data

[63] Continuation of Ser. No. 54,500, May 27, 1987, abandoned.

[30] Foreign Application Priority Data

May 27, 1986 [JP] Japan .................................. 61-120147
Sep. 4, 1986 [JP] Japan .................................. 61-206898

[51] Int. Cl.$^5$ ............................................. G11B 23/00
[52] U.S. Cl. ....................................... 428/694; 428/900
[58] Field of Search ........................ 428/694, 500, 900

[56] References Cited

U.S. PATENT DOCUMENTS

| | | | |
|---|---|---|---|
| 4,063,000 | 12/1977 | Aoruma et al. | 428/403 |
| 4,354,909 | 10/1982 | Takagi et al. | 427/39 |
| 4,382,110 | 5/1983 | Takagi et al. | 428/336 |
| 4,517,257 | 5/1985 | Shimiya et al. | 428/694 |
| 4,582,746 | 4/1986 | Shirahata et al. | 428/694 |
| 4,597,801 | 7/1986 | Stratta et al. | 106/308 Q |
| 4,599,280 | 7/1986 | Izumi et al. | 428/900 |

FOREIGN PATENT DOCUMENTS 73411 6/1981 Japan .
212118 12/1983 Japan .
2153852 8/1985 United Kingdom .

OTHER PUBLICATIONS

IEEE Transactions on Magnetics, vol. Mag-6, No. 3, pp. 503-506, Sep. 1970).
Electronics Symposium, pp. 549-552, (May 1967), "Recording Characteristics of Thick Cobalt-Zinc-Phosphorus Films".
Patent Abstracts of Japan, J58-212118A, Hitachi condenser.
Kinzoku Hyomen Gijutsi (Metal Surface Technique) Takano et al., vol. 31, 1980.
J. Electrochem. Soc., Morrison, vol. 6, No. 11-12, pp. 419-427.
J. Appl. Phys., Mahbub, Apr. 15, 1985, pp. 4026-4030.
Maeda, "High Coercivity Co and CoN: Alloy Films", J. Appl. Phys., 53(5), May 1982, p. 3735.

Primary Examiner—Paul J. Thibodeau
Attorney, Agent, or Firm—Oblon, Spivak, McClelland, Maier & Neustadt

[57] ABSTRACT

A magnetic recording medium is disclosed, which comprises a substrate having provided thereon a magnetic substance which is composed of an alloy comprising cobalt, phosphorus and at least one member selected from the group consisting of thallium and elements of group Vb of the periodic table, and optionally at least one member selected from the group consisting of nickel and zinc. The magnetic recording medium exhibits a high coercive force, squareness ratio and a high output with a small noise.

21 Claims, No Drawings

MAGNETIC RECORDING MEDIUM

This application is a continuation of application Ser. No. 07/054,500, filed on May 27, 1987, now abandoned.

BACKGROUND OF THE INVENTION

The present invention relates to a magnetic recording medium such as a magnetic disk, a magnetic drum or a magnetic tape.

Conventionally, magnetic recording media have been prepared by particulate coatings with magnetic substance or powder such as metal oxides or alloys that are dispersed in organic binders. However, demands for higher recording density are continuously increasing and researchers' attention has been drawn to methods of forming thin films of ferromagnetic metals such as iron, cobalt, nickel or alloys thereof by a variety of techniques including electroplating, electroless plating, vacuum evaporation and sputtering. Among the systems produced by these methods, cobalt alloy magnetic recording media have particularly high coercive forces and residual magnetization and are adapted for high-density recording. In order to achieve even higher recording densities with such cobalt alloy magnetic media, they must satisfy two additional requirements: first, a higher coercive force squareness ratio (hereinafter abbreviated as $S^*$), and secondly, a higher output with a smaller noise.

SUMMARY OF THE INVENTION

An object, therefore, of the present invention is to provide a magnetic recording media that has a higher $S^*$ value and which produces a higher output with a smaller noise.

With a view to attaining this object, various studies on the composition of magnetic substances have been conducted and as a result, it has been found that a higher $S^*$ value could be attained by incorporating thallium or at least one element of group Vb of the periodic table in a cobalt alloy, and that the alloy which additionally contained zinc produced a higher output with a smaller noise and yet retained the high $S^*$ value. The present invention has been accomplished on the basis of these findings.

According to a first aspect of the present invention, there is provided a magnetic recording medium which comprises a substrate having provided thereon a magnetic substance containing thallium in an alloy of cobalt and phosphorus.

A second aspect of the present invention is to provide a magnetic recording medium which comprises a substrate having provided thereon a magnetic substance containing at least one element of group Vb of the periodic table in an alloy of cobalt and phosphorus.

In a third aspect, the present invention provides a magnetic recording medium comprising a substrate having provided thereon a magnetic substance which additionally contains zinc in either one of the magnetic substances mentioned above.

DETAILED DESCRIPTION OF THE INVENTION

The substrate used in the present invention is made of an inorganic or organic nonmagnetic material. Illustrative inorganic materials include nonmagnetic metals or alloys such as aluminum, aluminum alloys, copper and silicon, as well as ceramics exemplified by glass, alumina and silica. Illustrative organic materials are synthetic resins such as ABS resins, polycarbonate resins and polyester resins.

The substrate may have an undercoat formed on its surface, such as a nonmagnetic nickel-phosphorus layer formed by electroless plating. The substrate or the undercoat formed on its surface is polished to give a mirror finish and after being optionally textured (i.e., provided with fine uniform concentric grooves on the surface), a magnetic substance is formed.

The magnetic substance is mainly composed of an alloy of cobalt and phosphorus, to which thallium or at least one element of group Vb of the periodic table is added. For adjustment of saturation magnetization, nickel may additionally be incorporated in the alloy. The elements belonging to group Vb of the periodic table are arsenic, antimony and bismuth, with arsenic and bismuth being particularly preferable.

The proportions of cobalt and phosphorus are not limited to any particular values but preferably cobalt is present in an amount of 70 to 95 atomic% and phosphorus 5 to 20 atomic%. If the cobalt content is less than 70 atomic%, the resulting magnetic recording medium has a reduced saturation magnetization and produces only a low output. A phosphorus content of at least 5 atomic% is inevitably attained if sodium hypophosphite is used as a reducing agent in electroless plating. If thallium is added to the alloy of cobalt and phosphorus, its content is preferably within the range of 0.5 to 5 atomic%. If the thallium content is less than 0.5 atomic%, the desired improvement in $S^*$ is not achieved. If the thallium content exceeds 5 atomic%, plating reaction will sometimes fail to be completed. If at least one element of group Vb of the periodic table is added to the alloy of cobalt and phosphorus, its content is also preferably in the range of 0.5 to 5 atomic%. If its content is less than 0.5 atomic%, the desired improvement in $S^*$ is not attainable. If its content exceeds 5 atomic%, the output of the resulting magnetic recording medium will contain an increased noise. Zinc suffices to be present in a trace amount.

If nickel is to be incorporated for the adjustment of saturation magnetization, its content is preferably in the range of 5 to 20 atomic%.

The magnetic substance is formed by electroless plating or sputtering. If the former method is employed, cobalt ions are generally contained in an electroless plating bath in the form of a sulfate salt, nitrate salt, halide or acetate salt. The concentration of cobalt ions typically ranges from 0.001 to 0.5 moles, preferably from 0.01 to 0.06 moles, per liter. Nickel ions are advantageously contained in the plating bath in the form of a sulfate salt, nitrate salt, halide or acetate salt. The concentration of nickel ions typically ranges from 0.0002 to 0.3 moles, preferably from 0.001 to 0.1 mole, per liter. Thallium ions are advantageously contained in the form of a sulfate salt, nitrate salt or halide. The concentration of thallium ions typically ranges from 5 to 200 ppm, preferably from 10 to 100 ppm. If the thallium ion concentration is less than 5 ppm, no improvement in $S^*$ is attainable. If the thallium concentration is more than 200 ppm, the reactivity of the plating bath is decreased to an undesirably low level. If arsenic is used as an element of group Vb of the periodic table, it is advantageously present in the plating bath in the form of arsenate or arsenite. The concentration of arsenic is typically within the range of $7 \times 10^{-5}$ to $3 \times 10^{-2}$ moles, preferably $1 \times 10^{-4}$ to $1.3 \times 10^{-2}$ moles, per liter. If bismuth is used as an element of group Vb of the periodic table, it is advantageously present in the plating bath in the form of a sulfate, nitrate or halide. The concentration of bismuth ions is typically within the range of $1\times10^{-4}$ to $1\times10^{-2}$ moles, preferably $2\times10^{-4}$ to $5\times10^{-3}$ moles, per liter. If the arsenic or bismuth content is less than the lower limits specified above, the desired improvement in $S^*$ is not attainable. If the arsenic or bismuth content exceeds their upper limits, the reactivity of the plating bath is decreased.

Zinc ions are advantageously used in the form of a sulfate salt, nitrate salt or halide. The concentration of zinc ions is typically within the range of $2\times10^{-6}$ to $2\times10^{-2}$ moles, preferably $0.5\times10^{-3}$ to $5\times10^{-3}$ moles, per liter. If the zinc ion concentration is less than $2\times10^{-6}$ moles per liter, the resulting magnetic recording medium is unable to produce a high output with a small noise. If the zinc ion concentration exceeds $2\times10^{-2}$ moles per liter, the reactivity of the plating bath is decreased.

In addition to the ions listed above, the electroless plating bath is required to contain a complexing agent, a buffering agent, a reducing agent and a pH adjuster. Compounds containing a carboxyl, amino or hydroxyl group in their molecule are known to be usable as complexing agents. Suitable examples thereof are amino acids such as α-alanine and serine, and dicarboxylic acids such as malonic acid and succinic acid. Also usable are oxycarboxylic acids such as gluconic acid, tartaric acid, mucic acid and citric acid. These complexing agents are typically used in concentrations ranging from 0.01 to 2.0 moles per liter.

Useful buffering agents include ammonium salts, carbonates, borates, phosphates and organic acid salts and these may be used in concentrations ranging from 0.05 to 2.0 moles per liter.

Illustrative reducing agents include dimethylaminoborane, boron hydride compounds, hydrazine salts, and sodium hypophosphite. In consideration of the stability of plating bath, sodium hypophosphite is desirably used in a concentration of 0.01 to 2.0 moles per liter.

A suitable pH adjuster may be selected from among aqueous ammonia, sodium hydroxide, potassium hydroxide and sodium carbonate. The plating bath desirably has a pH within the range of 7.5 to 11.0.

The plating bath preferably has a temperature in the range of 55 to 90° C.

The magnetic substance may be formed by sputtering. In this method, a target that is made of cobalt-phosphorus or a cobalt-nickel-phosphorus alloy which contain thallium or at least one element of group Vb of the periodic table, and optionally zinc may be sputtered to form a desired magnetic layer on the surface of a substrate. A magnetic substance having an enhanced coercive force can be produced by sputtering a target that additionally contains chromium in the alloy described above.

After the magnetic substance is formed on the substance, it is provided with an overlying protective coat which is typically a silica film formed by spin coating or a carbon film made by sputtering.

The following examples and comparative examples are provided for the purpose of further illustrating the present invention but are in no sense to be taken as limiting.

EXAMPLE 1

Aluminum disks having an outside diameter of 95 mm, an inside diameter of 25 mm, and a thickness of 1.27 mm were made by lathing. A nickel-phosphorus undercoat with a thickness of 20 μm was formed on the surface of each of these disks by electroless plating. The surface of the undercoat was mirror-finished with a polishing machine to provide a surface roughness (Rmax) of 0.04 μm. Fine concentric grooves were cut on the mirror surface with a texturing machine, with care being taken to retain the surface roughness (Rmax) of 0.04 μm.

Each of the aluminum disks (hereinafter referred to as Ni-P substrates) thus prepared was degreased by immersion in an aqueous solution of sodium hydroxide 2 mol/l) at 40° C. for 5 minutes. A plating bath (10 l) having the composition indicated in Table 1 was adjusted to a pH of 8.6 by addition of sodium hydroxide and its temperature was elevated to 75° C. The degreased Ni-P substrates were immersed in this plating bath to form a layer of magnetic material in a thickness of 0.10 μm. A carbon film 500 Å thick was formed on the magnetic layer by sputtering.

The thus fabricated magnetic recording disks were subjected to measurements of $S^*$, output and noise. For $S^*$ measurement, specimens (7 mm × 14 mm) were cut from the disks and measurement was conducted with a vibrating sample magnetometer in a maximum magnetic field of 10 kOe. Output measurement was conducted with a magnetic head for a track density of 900 TPI under the following conditions: 1F frequency, 1.25 MHz; 2F frequency, 2.5 MHz; relative speed, 9.6 m/sec; and resolution (2F/1F output ratio), 80 to 82%. Noise measurement was conducted with a spectrum analyzer.

The results of measurements are summarized in Table 1, from which it can be seen that all samples were improved with respect to $S^*$, output and noise and were suitable for use as high-density recording media in commercial applications.

The samples were analyzed by ESCA (electron spectroscopy for chemical analysis) and they were found to contain 1.6 atomic% of thallium as indicated in Table 2. This result shows that thallium added to a magnetic substance is effective in improving the $S^*$, output and noise characteristics of the samples.

EXAMPLE 2

A magnetic layer was formed on Ni-P substrates by repeating the procedures of Example 1 under the same conditions except that the plating bath additionally contained nickel sulfate and sodium gluconate, with the concentration of mucic acid being reduced as shown in Table 1.

The results obtained were substantially the same as those attained in Example 1. As shown in Table 2, the samples were found to contain thallium, from which it is clearly evident that thallium added to a magnetic substance is effective in improving the $S^*$, output and noise characteristics of the samples as confirmed in Example 1.

COMPARATIVE EXAMPLE 1

A magnetic layer was formed on Ni-P substrates by repeating the procedures of Example 1 under the same conditions except that no thallium sulfate was present in the plating bath. The results are summarized in Table 1, from which it can be seen that the magnetic substance (i e., Co-P coat) containing no thallium has a low $S^*$ value and produces a low output while suffering increased noise.

COMPARATIVE EXAMPLE 2

A magnetic layer was formed on Ni-P substrates by repeating the procedures of Example 2 under the same conditions except that no thallium sulfate was present in the plating bath. The results are summarized in Table 1, from which it can be seen that as in Comparative Example 1, the magnetic substance (Co-Ni-P coat) containing no thallium has a low S* value and produces a low output while suffering increased noise.

EXAMPLE 3

A magnetic layer was formed on Ni-P substrates by repeating the procedures of Example 1 under the same conditions except that the plating bath additionally contained zinc sulfate. As in Example 1, the resulting samples exhibited a high S* value and yet they had better output and noise characteristics (high output and low noise). As shown in Table 2, ESCA revealed that the magnetic substance (Co-P coat) contained not only thallium but also zinc. It is therefore clear that a magnetic substance containing both thallium and zinc has very good output and noise characteristics and yet retains the high S* value achieved by incorporating thallium.

EXAMPLE 4

A magnetic layer was formed on Ni-P substrates by repeating the procedures of Example 2 under the same conditions except that the plating bath additionally contained zinc sulfate. As in Example 3, the resulting samples produced a higher output with a smaller noise. The magnetic substance (Co-Ni-P coat) was found to contain thallium and zinc and it was clear that incorporating both thallium and zinc in a magnetic material is highly effective in improving its output and noise characteristics.

EXAMPLE 5

An experiment was conducted to investigate the effect of thallium concentration of a plating bath on the coercive force of the resulting magnetic material. As shown in Table 3, seven runs of experiment were conducted using plating baths with varying concentrations of thallium sulfate. The concentrations of the other components were held constant (cobalt sulfate, 0.03 moles/l; mucic acid, 0.2 moles/l; boric acid, 0.4 moles/l; sodium hypophosphite, 0.3 moles/l). In each run, the pH of the plating bath was adjusted to 8.6 by addition of sodium hydroxide.

As is clear from Table 3, the coercive force of magnetic materials decreased as the concentration of thallium sulfate increased. At thallium concentrations of 10 ppm or more, the magnetic materials exhibited S* values of 0.90 or more. These results show that through proper adjustment of the concentration of thallium sulfate in a plating bath, magnetic materials having varying coercive forces can be attained without sacrificing their high S* values. This effect is clearly evident when the thallium concentration is 10 ppm and upward. The same results were observed in plating baths that additionally contained nickel ions optionally combined with zinc ions.

TABLE 1

| | Composition of Plating Bath (mol/l) | | | | | | | Results of Evaluation | | | | | |
| | Cobalt Sulfate | Nickel Sulfate | Thallium Sulfate (ppm) | Zinc Sulfate | Mucic Acid | Sodium Gluconate | Boric Acid | Sodium Hypophosphite | Film Thickness (μm) | S* (—) | Output 1F (mV) | Output 2F (mV) | Resolution at Output Measurement (%) | Noise (μV rms) |
|---|---|---|---|---|---|---|---|---|---|---|---|---|---|---|
| Example | | | | | | | | | | | | | | |
| 1 | 0.03 | 0 | 50 | 0 | 0.2 | 0 | 0.4 | 0.30 | 0.08 | 0.92 | 0.53 | 0.43 | 81 | 3.0 |
| 2 | 0.03 | 0.01 | 50 | 0 | 0.1 | 0.2 | 0.6 | 0.25 | 0.08 | 0.91 | 0.50 | 0.40 | 80 | 3.8 |
| 3 | 0.03 | 0 | 50 | 0.002 | 0.2 | 0 | 0.4 | 0.30 | 0.08 | 0.93 | 0.56 | 0.46 | 82 | 1.8 |
| 4 | 0.03 | 0.01 | 50 | 0.002 | 0.1 | 0.2 | 0.6 | 0.25 | 0.08 | 0.92 | 0.52 | 0.42 | 81 | 2.2 |
| Comparative Example | | | | | | | | | | | | | | |
| 1 | 0.03 | 0 | 0 | 0 | 0.2 | 0 | 0.4 | 0.30 | 0.08 | 0.85 | 0.51 | 0.41 | 80 | 4.0 |
| 2 | 0.03 | 0.01 | 0 | 0 | 0.1 | 0.2 | 0.6 | 0.25 | 0.08 | 0.84 | 0.47 | 0.38 | 81 | 5.0 |

TABLE 2

| | Composition of Magnetic Substance (atomic %) | | | | |
| | Co | Ni | Tl | Zn | P |
|---|---|---|---|---|---|
| Example | | | | | |
| 1 | 88.7 | 0 | 1.6 | 0 | 9.7 |
| 2 | 74.8 | 10.8 | 1.4 | 0 | 13.0 |
| 3 | 88.5 | 0 | 1.8 | trace | 9.7 |
| 4 | 74.6 | 11.0 | 1.5 | trace | 12.9 |
| Comparative Example | | | | | |
| 1 | 91.0 | 0 | 0 | 0 | 9.0 |
| 2 | 75.9 | 11.9 | 0 | 0 | 12.2 |

TABLE 3

| Run No. | Concentration of Thallium Sulfate in Plating Bath (ppm) | Characteristics of Magnetic Substance | | |
| | | Thickness (μm) | Coercive Force (Oe) | S* (—) |
|---|---|---|---|---|
| 1 | 0 | 0.10 | 900 | 0.80 |
| 2 | 1 | 0.10 | 890 | 0.82 |
| 3 | 10 | 0.10 | 860 | 0.90 |
| 4 | 20 | 0.10 | 800 | 0.90 |
| 5 | 30 | 0.10 | 745 | 0.91 |
| 6 | 40 | 0.10 | 700 | 0.92 |
| 7 | 50 | 0.10 | 640 | 0.92 |

EXAMPLES 6–13

Ni-P substrates prepared in the same manner as in Example 1 were degreased by immersion in an aqueous solution of sodium hydroxide (2 mol/l) at 40° C. for 5 minutes. Plating baths (10 l) having the compositions indicated in Table 4 were adjusted to a pH of 8.6 by addition of sodium hydroxide and their temperature was elevated to 75° C. The degreased Ni-P substrates were immersed in these plating baths to form layers of magnetic substance in a thickness of 0.08 μm. Carbon films 500 Å thick were formed on the magnetic layers by sputtering.

The thus fabricated magnetic recording disks were subjected to measurements of S*, output and noise. For S* measurement, speciments (7 mm×14 mm) were cut from the disks and measurement was conducted with a vibrating sample magnetometer in a maximum magnetic field of 10 kOe. Output measurement was conducted with a magnetic head for a track density of 900 TPI under the following conditions: 1F frequency, 1.25 MHz; 2F frequency, 2.5 MHz; and relative speed, 9.6 m/sec. Noise measurement was conducted with a spectrum analyzer.

The results of measurements are summarized in Table 4, from which it can be seen that all samples were improved with respect to S*, output and noise and were suitable for use as high-density recording media in commercial applications.

Analysis by ESCA revealed the presence of 1 to 2 atomic% arsenic or bismuth in the magnetic material layers of the samples (see Table 5). Samples prepared in Examples 8, 9, 12 and 13 were found to contain a trace amount of zinc. These results show that a magnetic material incorporating an element of group Vb of the periodic table has improved S*, output and noise characteristics, the improvement being enhanced if the element is contained in combination with zinc.

cobalt sulfate; 0.2 moles/l, mucic acid; 0.4 moles/l, boric acid; and 0.3 moles/l, sodium hypophosphite.

The results are summarized in Table 6, from which it can be seen that in both plating systems (one containing As, and the other containing Bi), the purposes of achieving a higher output and lower noise could be attained by incorporating zinc at concentrations of $0.5 \times 10^{-3}$ moles/l and higher.

EXAMPLES 15

An experiment was conducted to investigate the profile of coercivity vs the concentration in plating bath of a compound containing an element of group Vb of the periodic table. As shown in Table 7, thirteen runs of experiment were conducted using plating baths with varying concentrations of the compound. The concentrations of the other components were held constant (cobalt sulfate, 0.03 moles/l; mucic acid, 0.2 moles/l; boric acid, 0.4 moles/l; and sodium hypophosphite, 0.3 moles/l). In each run, the pH of the plating bath was adjusted to 8.6 by addition of sodium hydroxide.

As is clear from Table 7, the coercive force of magnetic materials decreased as the concentration of arsenic or bismuth increased. The magnetic materials exhibited S* values of 0.90 and above at arsenic concentrations of $3 \times 10^{-3}$ moles/l and higher or at bismuth concentrations of $0.5 \times 10^{-3}$ moles/l and higher. These results show that through proper adjustment of the concentration of an element of group Vb of the periodic table in plating bath, magnetic materials having varying coercive forces can be obtained without sacrificing their high S* values.

TABLE 4

| | Composition of Plating Bath (mol/l) | | | | | | | | Results of Evaluation | | | | | |
|---|---|---|---|---|---|---|---|---|---|---|---|---|---|---|
| | Cobalt Sulfate | Nickel Sulfate | Sodium Arsenate | Bismuth Sulfate | Zinc Sulfate | Mucic Acid | Sodium Gluconate | Boric Acid | Sodium Hypophosphite | Film Thickness (μm) | S* (—) | $\overline{g}$ Output 1F (mV) | Output 2F (mV) | Resolution (%) | Noise (μV) RMS |
| Example | | | | | | | | | | | | | | | |
| 6 | 0.03 | 0 | 0.011 | 0 | 0 | 0.2 | 0 | 0.4 | 0.30 | 0.08 | 0.92 | 0.54 | 0.43 | 80 | 3.0 |
| 7 | 0.03 | 0.01 | 0.011 | 0 | 0 | 0.1 | 0.2 | 0.6 | 0.25 | 0.08 | 0.91 | 0.53 | 0.42 | 79 | 3.8 |
| 8 | 0.03 | 0 | 0.011 | 0 | 0.002 | 0.2 | 0 | 0.4 | 0.30 | 0.08 | 0.93 | 0.53 | 0.46 | 87 | 1.8 |
| 9 | 0.03 | 0.01 | 0.011 | 0 | 0.002 | 0.1 | 0.2 | 0.6 | 0.25 | 0.08 | 0.92 | 0.54 | 0.45 | 83 | 2.2 |
| 10 | 0.03 | 0 | 0 | 0.002 | 0 | 0.2 | 0 | 0.4 | 0.30 | 0.08 | 0.92 | 0.54 | 0.43 | 80 | 3.2 |
| 11 | 0.03 | 0.01 | 0 | 0.002 | 0 | 0.1 | 0.2 | 0.6 | 0.25 | 0.08 | 0.91 | 0.53 | 0.42 | 79 | 3.9 |
| 12 | 0.03 | 0 | 0 | 0.002 | 0.002 | 0.2 | 0 | 0.4 | 0.30 | 0.08 | 0.93 | 0.54 | 0.47 | 87 | 1.9 |
| 13 | 0.03 | 0.01 | 0 | 0.002 | 0.002 | 0.1 | 0.2 | 0.6 | 0.25 | 0.08 | 0.92 | 0.53 | 0.44 | 83 | 2.1 |
| Comparative Example | | | | | | | | | | | | | | | |
| 3 | 0.03 | 0 | 0 | 0 | 0 | 0.2 | 0 | 0.4 | 0.30 | 0.08 | 0.85 | 0.54 | 0.40 | 74 | 4.0 |
| 4 | 0.03 | 0.01 | 0 | 0 | 0 | 0.1 | 0.2 | 0.6 | 0.25 | 0.08 | 0.84 | 0.53 | 0.38 | 72 | 5.0 |

COMPARATIVE EXAMPLES 3 AND 4

Magnetic layers were formed on Ni-P substrates by repeating the procedures of Examples 6 to 13 under the same conditions except that none of the elements of group Vb of the periodic table were incorporated in the plating bath. The results are shown in Table 4, from which it can be seen that the samples had low S* values and produced low outputs while suffering increased noise.

EXAMPLE 14

The effects of the zinc concentration of plating bath on S*, output and noise were investigated. An experiment was conducted both for the case of addition of arsenic (run Nos. 1 to 6) and for the case of bismuth addition (run Nos. 7 to 12). The basic composition of the plating bath was the same for all runs; 0.03 moles/l,

TABLE 5

| | Composition of Magnetic Material (atomic %) | | | | | |
|---|---|---|---|---|---|---|
| | Co | Ni | As | Bi | Zn | P |
| Example | | | | | | |
| 6 | 88.7 | 0 | 1.6 | 0 | 0 | 9.7 |
| 7 | 74.8 | 10.9 | 1.3 | 0 | 0 | 13.0 |
| 8 | 88.5 | 0 | 1.9 | 0 | trace | 9.6 |
| 9 | 74.6 | 11.0 | 1.5 | 0 | trace | 12.9 |
| 10 | 88.8 | 0 | 0 | 1.5 | 0 | 9.7 |
| 11 | 74.7 | 10.9 | 0 | 1.3 | 0 | 13.1 |
| 12 | 88.7 | 0 | 0 | 1.6 | trace | 9.7 |
| 13 | 74.5 | 11.0 | 0 | 1.4 | trace | 13.1 |
| Comparative Example | | | | | | |
| 3 | 91.0 | 0 | 0 | 0 | 0 | 9.0 |

TABLE 5-continued

| | Composition of Magnetic Material (atomic %) | | | | | |
|---|---|---|---|---|---|---|
| | Co | Ni | As | Bi | Zn | P |
| 4 | 75.9 | 11.9 | 0 | 0 | 0 | 12.2 |

TABLE 6

| Run No. | Concentration of Compound Containing Element of Group Vb of the Periodic Table in Plating Bath ($10^{-3}$ mol/l) | | Concentration of Zinc Sulfate in Plating Bath ($10^{-3}$ mol/l) | Film Thickness ($\mu$m) | S* (—) | Output | | Resolution (%) | Noise ($\mu$V rms) |
|---|---|---|---|---|---|---|---|---|---|
| | Sodium Arsenate | Bismuth Sulfate | | | | 1F (mV) | 2F (mV) | | |
| 1 | 11 | 0 | 0 | 0.08 | 0.92 | 0.54 | 0.43 | 80 | 3.0 |
| 2 | 11 | 0 | 0.1 | 0.08 | 0.92 | 0.53 | 0.44 | 83 | 2.5 |
| 3 | 11 | 0 | 0.5 | 0.08 | 0.92 | 0.53 | 0.46 | 87 | 1.8 |
| 4 | 11 | 0 | 1 | 0.08 | 0.92 | 0.53 | 0.46 | 87 | 1.8 |
| 5 | 11 | 0 | 3 | 0.08 | 0.93 | 0.54 | 0.47 | 87 | 1.8 |
| 6 | 11 | 0 | 5 | 0.08 | 0.93 | 0.53 | 0.46 | 87 | 1.8 |
| 7 | 0 | 2 | 0 | 0.08 | 0.92 | 0.54 | 0.43 | 80 | 3.2 |
| 8 | 0 | 2 | 0.1 | 0.08 | 0.92 | 0.53 | 0.44 | 83 | 2.5 |
| 9 | 0 | 2 | 0.5 | 0.08 | 0.93 | 0.54 | 0.47 | 87 | 1.9 |
| 10 | 0 | 2 | 1 | 0.08 | 0.93 | 0.53 | 0.46 | 87 | 1.9 |
| 11 | 0 | 2 | 3 | 0.08 | 0.93 | 0.53 | 0.46 | 87 | 1.9 |
| 12 | 0 | 2 | 5 | 0.08 | 0.93 | 0.54 | 0.47 | 87 | 1.9 |

TABLE 7

| Run No. | Concentration of Compound Containing Element of Group Vb of the Periodic Table in Plating Bath ($10^{-3}$ mol/l) | | Characteristics of Magnetic Material | | |
|---|---|---|---|---|---|
| | Sodium Arsenate | Bismuth Sulfate | Thickness ($\mu$m) | Coercive Force (Oe) | S* (—) |
| 1 | 0 | 0 | 0.08 | 900 | 0.80 |
| 2 | 0.01 | 0 | 0.08 | 890 | 0.82 |
| 3 | 3 | 0 | 0.08 | 860 | 0.90 |
| 4 | 5 | 0 | 0.08 | 800 | 0.90 |
| 5 | 8 | 0 | 0.08 | 745 | 0.91 |
| 6 | 11 | 0 | 0.08 | 700 | 0.92 |
| 7 | 13 | 0 | 0.08 | 640 | 0.92 |
| 8 | 0 | 0.02 | 0.08 | 890 | 0.82 |
| 9 | 0 | 0.5 | 0.08 | 865 | 0.90 |
| 10 | 0 | 1.0 | 0.08 | 800 | 0.90 |
| 11 | 0 | 1.5 | 0.08 | 750 | 0.91 |
| 12 | 0 | 2.0 | 0.08 | 700 | 0.92 |
| 13 | 0 | 2.5 | 0.08 | 650 | 0.92 |

The above results show that the present invention attains the following advantages: (1) by using a cobalt-phosphorus alloy containing thallium or at least one element of group Vb of the periodic table, a magnetic recording material that has a high S* value and which produces a high output with a reduced noise can be obtained; and (2) a cobalt alloy that additionally contains zinc will produce a magnetic medium adapted to high-density recording that has significantly improved output and noise characteristics and which yet retains the high S* value.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, having a coercive force squareness ratio of not less than 0.90, comprising a substrate having provided thereon by electroless plating a magnetic substance which is composed of an alloy comprising cobalt, phosphorus and at least one element selected from the group consisting of thallium, bismuth, arsenic and antimony in an amount of at least 0.05 to about 5 atomic percent.

2. The magnetic recording medium as claimed in claim 1, wherein said alloy further comprises at least one member selected from the group consisting of nickel and zinc.

3. The magnetic recording medium as claimed in claim 1, wherein said alloy is composed of cobalt, phosphorus and thallium.

4. The magnetic recording medium as claimed in claim 2, wherein said alloy is composed of cobalt, phosphorus, nickel and thallium.

5. The magnetic recording medium as claimed in claim 2, wherein said alloy is composed of cobalt, phosphorus, thallium and zinc.

6. The magnetic recording medium as claimed in claim 2, wherein said alloy is composed of cobalt, phosphorus, nickel, thallium and zinc.

7. The magnetic recording medium as claimed in claim 2, wherein said alloy is composed of 70 to 95 atomic% cobalt, 5 to 20 atomic% phosphorus, 0 to 20 atomic % nickel and 0.5 to 5 atomic% thallium.

8. The magnetic recording medium as claimed in claim 2, wherein said alloy is composed of 70 to 95 atomic% cobalt, 5 to 20 atomic% phosphorus, up to 20 atomic% nickel, 0.5 to 5 atomic% thallium, and zinc, wherein the content of said zinc results from the use of about $2 \times 10^{-6}$ to $2 \times 10^{-2}$ mol/l of zinc ion in an electroless plating bath.

9. The magnetic recording medium as claimed in claim 2, wherein said alloy is composed of cobalt, phosphorus, nickel, and at least one element selected from the group consisting of thallium, bismuth, arsenic and antimony.

10. The magnetic recording medium as claimed in claim 1, wherein said at least one element is arsenic.

11. The magnetic recording medium as claimed in claim 9, wherein said at least one element is arsenic.

12. The magnetic recording medium as claimed in claim 1, wherein said at least one element is bismuth.

13. The magnetic recording medium as claimed in claim 9, wherein said at least one element is bismuth.

14. The magnetic recording medium as claimed in claim 2, wherein said alloy is composed of cobalt, phosphorus, zinc and at least one element selected from the group consisting of thallium, bismuth, arsenic, and antimony.

15. The magnetic recording medium as claimed in claim 2, wherein said alloy is composed of cobalt, phosphorus, nickel, zinc and at least one element selected from the group consisting of thallium, bismuth, arsenic, and antimony.

16. The magnetic recording medium as claimed in claim 2, wherein said alloy is composed of 70 to 95 atomic% cobalt, 5 to 20 atomic% phosphorus, up to 20 atomic% nickel and 0.5 to 5 atomic% arsenic.

17. The magnetic recording medium as claimed in claim 2, wherein said alloy is composed of 70 to 95 atomic% cobalt, 5 to 20 atomic% phosphorus, up to 20 atomic% nickel and 0.5 to 5 atomic% bismuth.

18. The magnetic recording medium as claimed in claim 2, wherein said alloy is composed of 70 to 95 atomic% cobalt, 5 to 20 atomic% phosphorus, up to nickel, 0.5 to 5 atomic% arsenic and zinc, wherein the content of said zinc results from the use of about $2 \times 10^{-6}$ to $2 \times 10^{-2}$ mol/l of zinc ion in an electroless plating bath.

19. The magnetic recording medium as claimed in claim 2, wherein said alloy is composed of 70 to 95 atomic% cobalt, 5 to 20 atomic% phosphorus, up to 20 atomic% of nickel, 0.5 to 5 atomic% bismuth and zinc, wherein the content of said zinc results from the use of about $2 \times 10^{-6}$ to $2 \times 10^{-2}$ mol/l of zinc ion in an electroless plating bath.

20. The magnetic recording medium as claimed in claim 1, wherein said magnetic substance on said substrate is composed of an alloy comprising cobalt, phosphorus and at least one element selected from the group consisting of thallium, bismuth and arsenic.

21. The magnetic recording medium as claimed in claim 1, wherein said coercive force squareness ratio is in the range of about 0.90 to 0.93.

* * * * *